United States Patent
Eiermann et al.

(10) Patent No.: US 11,205,863 B1
(45) Date of Patent: Dec. 21, 2021

(54) ELECTRICAL CONNECTION ASSEMBLY EMPLOYING A COMPRESSION FITTING DEFORMED BY A COMPRESSION SLEEVE

(71) Applicant: Raytheon Company, Waltham, MA (US)

(72) Inventors: Robert Eiermann, Ashland, MA (US); Richard J. Adams, Charlestown, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/037,184

(22) Filed: Sep. 29, 2020

(51) Int. Cl.
*H01R 4/30* (2006.01)
*H01R 4/34* (2006.01)

(52) U.S. Cl.
CPC ............. *H01R 4/302* (2013.01); *H01R 4/305* (2013.01); *H01R 4/34* (2013.01)

(58) Field of Classification Search
CPC .......... H01R 4/34; H01R 4/302; H01R 4/305; H01R 4/38; H01R 4/64; F16B 29/00; F16B 39/028; F16B 37/046; F16B 37/047; F16B 37/122
See application file for complete search history.

(56) References Cited

U.S. PATENT DOCUMENTS

| | | | |
|---|---|---|---|
| 6,547,573 B1 * | 4/2003 | Allen | H01R 4/64 439/92 |
| 2017/0054227 A1 * | 2/2017 | Cumant | H01R 4/305 |

FOREIGN PATENT DOCUMENTS

| | | | | |
|---|---|---|---|---|
| CN | 105576579 | * | 5/2016 | ............... H01R 4/38 |
| DE | 20102063 U1 | | 6/2001 | |
| FR | 979032 A | | 4/1951 | |
| WO | WO 2006/057592 A1 | | 6/2006 | |

OTHER PUBLICATIONS

International Search Report for International Application No. PCT/US2021/043583 dated Nov. 2, 2021, 12 pages.

* cited by examiner

*Primary Examiner* — Vanessa Girardi (57) ABSTRACT

An electrical nut assembly for coupling an electrical lug to an electrical post is disclosed. The electrical nut assembly comprises a compression fitting and a compression sleeve. The compression fitting comprises a material comprising a first yield strength and comprises an internal thread operable to electrically couple to the electrical post and a base surface configured to electrically couple to the electrical lug. The compression sleeve comprises a material comprising a second yield strength greater than the first yield strength and is sized to at least partially cover the compression fitting. The compression sleeve is configured to compress the compression fitting in a radial direction when fitted at least partially over the compression fitting and pressed or advanced axially towards the base surface and as the compression fitting makes contact with the electrical lug.

23 Claims, 8 Drawing Sheets

ELECTRICAL CONNECTION ASSEMBLY EMPLOYING A COMPRESSION FITTING DEFORMED BY A COMPRESSION SLEEVE

GOVERNMENT LICENSE RIGHTS

This invention was made with Government support under HQ0862-21-F-0001, awarded by the Missile Defense Agency. The Government has certain rights in this invention.

BACKGROUND

Removable electrical connectors can comprise a wire stud or post and a wire lug. The wire lug can have an aperture to facilitate fitting the wire lug over the wire post and a nut can be threaded over the wire post and tightened to secure the wire lug to the wire post, thus forming an electrical connection between the wire post and the wire lug. Over time the electrical connection between the wire lug and the wire post can loosen due to thermal expansion and contraction as the electrical connection heats and cools from ambient conditions and current passing through the electrical connection, or due to vibrations propagating through the electrical connectors, such as those caused by operation of a vehicle, a motor, or any other operating scenario where vibrations are generated or otherwise exist. A loose connection increases the electrical resistance between the wire post and the wire lug leading to increased heat. The electrical connection can eventually fail completely or can fail intermittently. To prevent the electrical connection from failing, it may be necessary to periodically tighten the nut on the wire post to ensure a stable connection. Such maintenance can be time consuming or impractical depending on the location of the removable electrical connector.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the examples illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

An initial overview of the inventive concepts is provided below, and then specific examples are described in further detail later. This initial summary is intended to aid readers in understanding the examples more quickly but is not intended to identify key features or essential features of the examples, nor is it intended to limit the scope of the claimed subject matter.

In one example, an electrical nut assembly for coupling an electrical lug to an electrical post is disclosed. The electrical nut assembly comprises a compression fitting and a compression sleeve. The compression fitting can have a first yield strength and the compression fitting can comprise an internal thread operable to electrically couple to the electrical post and a base having a base surface configured to electrically couple to the electrical lug. The compression sleeve can have a second yield strength greater than the first yield strength and is sized to at least partially fit over the compression fitting. The compression sleeve is configured to compress the compression fitting in a radial direction when fitted at least partially over the compression fitting and advanced axially towards the base surface of the compression fitting, and as the compression fitting makes contact with the electrical lug.

In a more detailed aspect, the compression fitting can comprises a first material and the compression sleeve can comprise a second material, and the second material can have a yield strength greater than a yield strength of the first material.

In a more detailed aspect, a groove can be formed at the base of the internal thread.

In a more detailed aspect, the compression sleeve can comprise an internal thread configured to be threaded over the electrical post.

In a more detailed aspect, the compression fitting can comprise a tapered protrusion and the compression sleeve can comprise a tapered recess.

In a more detailed aspect, the compression fitting can comprise at least one longitudinal slot.

In a more detailed aspect, the electrical nut assembly can further comprise a lock nut comprising an internal thread and configured to lock to the compression sleeve in place against the compression fitting.

In a more detailed aspect, the compression sleeve can have a smooth tapered inner surface configured to interface with an outer surface of the compression fitting.

In a more detailed aspect, the compression fitting can have at least one set of parallel flat surfaces on an external surface of the compression fitting.

In a more detailed aspect, the compression sleeve can have a smooth cylindrical outer surface.

Also disclosed is an electrical connection assembly comprising a threaded electrical post, an electrical lug, a compression fitting, and a compression sleeve. The threaded electrical post is electrically coupled to an electrical component and comprises an external thread and a planar support surface. The electrical lug comprises an aperture and is supported by the planar support surface with the threaded electrical post extending through the aperture. The compression fitting can have a first yield strength. The compression fitting comprises an internal thread sized to complement (i.e., thread onto or otherwise mate with) the external thread of the threaded electrical post. The compression sleeve can have a second yield strength greater than the first yield strength. The compression sleeve at least partially fits over and covers the compression fitting and compresses the compression fitting in a radial direction and an axial direction against the planar support surface.

In a more detailed aspect, compression of the compression fitting by the compression sleeve deforms the internal thread of the compression fitting and conforms the internal thread of the compression fitting to the external thread of the threaded electrical post, thereby reducing gaps between the internal thread and the external thread.

In a more detailed aspect, compression of the compression fitting by the compression sleeve deforms the internal thread of the compression fitting and creates an interference fit of the internal threads of the compression sleeve with the external threads of the threaded electrical post.

In a more detailed aspect, the compression sleeve can comprise an internal thread threaded on the external thread of the threaded electrical post.

In a more detailed aspect, the compression fitting can comprise a tapered protrusion and the compression sleeve can comprise a tapered recess, wherein the tapered recess is fitted over the tapered protrusion.

In a more detailed aspect, the compression fitting can comprise at least one longitudinal slot to facilitate deformation of the compression fitting.

In a more detailed aspect, the electrical connection assembly can further comprise a lock nut comprising an internal thread and threaded over the threaded electrical post. The locknut locks the compression sleeve in place against the compression fitting.

Also disclosed is a method of securing an electrical lug to an electrical post. The method comprises fitting an electrical lug over an electrical post having an external thread, fitting a compression fitting having a first yield strength over the electrical post and pressing or advancing the compression fitting against the electrical lug, and fitting a compression sleeve having a second yield strength greater than the first yield strength over the compression fitting and advancing the compression sleeve axially to axially compress the compression fitting against the electrical lug and radially compress the compression fitting against the electrical post. The method further comprises compressing the compression fitting sufficiently to deform the compression fitting, and to conform the compression fitting, at least in part, to the electrical post.

In a more detailed aspect, the method can further comprise threading a lock nut over the electrical post to secure the compression sleeve, compression fitting and the electrical lug.

In a more detailed aspect, the compression sleeve is pressed axially by way of a nut threaded over the electrical post.

To further describe the present technology, examples are now provided with reference to the figures. FIGS. 1-4 illustrate an example of an electrical connection assembly 10 in accordance with an example of the present disclosure. The electrical connection assembly 10 comprises a threaded electrical post 12, an electrical lug 14 operably coupled with a wire, cable or other similar component that is electrically coupled to an electrical source (breaker, battery, etc.), and an electrical nut assembly 16 for coupling the electrical lug 14 to the threaded electrical post 12, such that an electrical connection is established between these. The electrical nut assembly 16 can comprise a compression fitting 18 and a compression sleeve 20. In use, and as configured to do so, the compression sleeve 20 compresses the compression fitting 18 around the threads of the threaded electrical post 12, thus conforming the compression fitting 18, at least in part, to the threaded electrical post 12, to eliminate at least some air gaps between internal threads of the compression fitting 18 and external threads 22 of the threaded electrical post 12, which operates to reduce electrical resistance and to ensure a more robust electrical connection over conventional connection assemblies.

The threaded electrical post 12 can be any type of threaded electrical post having external threads 22. The threaded electrical post 12 can be electrically coupled to an electrical component using any known coupling arrangement and/or technique, such as by soldering or by utilizing a compression fitting. The threaded electrical post 12 can comprise a planar support surface 24 for supporting the electrical lug 14. For example, the threaded electrical post 12 shown in FIGS. 1-4 comprises a support nut 26 threaded onto the threaded electrical post 12. The support nut 26 has a planar support surface 24 for supporting the electrical lug 14. In other examples, the threaded electrical post 12 can have a planar support surface 24 integrally formed therein, or a base of the threaded electrical post 12 could serve as and provide or define a planar support surface 24.

The electrical lug 14 can be any type of electrical lug, and can be electrically coupled to an electrical component (e.g., wire, cable or other similar component electrically coupled to an electrical source) using any known coupling arrangement and/or technique, such as by soldering or by utilizing a crimped fitting. The electrical lug 14 can comprise an aperture 26 sized and shaped to receive the threaded electrical post 12, or in other words, to facilitate fitting of the electrical lug 14 over the threaded electrical post 12. For example, the aperture 26 can have a diameter that is larger than a major thread diameter of the threaded electrical post 12, such that the threaded electrical post 12 can slide within the aperture 26.

When assembled, the electrical lug 14 is place over the threaded electrical post 12 with the threaded electrical post 12 received in the aperture 26 of the electrical lug 14. The electrical lug 14 can then be slid along the threaded electrical post 12 (i.e., the threaded electrical post 12 and the electrical lug 14 can slide relative to one another) until the electrical lug 14 contacts the planar support surface 24. As will be described in relation to the electrical nut assembly 16, the electrical nut assembly 16 can then be tightened in an axial direction by threading the electrical nut assembly 16 on the threaded electrical post 12 until the electrical nut assembly 16 contacts the electrical lug 14 compressing the electrical lug 14 between the planar support surface 24 and the electrical nut assembly 16, thereby securing the electrical lug 14 to the threaded electrical post 12.

The compression fitting 18 of the electrical nut assembly 16 can have a lower yield strength relative to a yield strength of the compression sleeve 20, such that the compression sleeve 20 is able to impart a radial compression force to the compression fitting 18 to deform the compression fitting 18, at least in part, upon being fit over the compression fitting 18. In some examples, the lower yield strength of the compression fitting 18 can be achieved as a result of the structural configuration of the compression fitting 18, even when the compression fitting 18 and compression sleeve 20 are made of the same material. In one aspect, the compression fitting 18 can have a thinner profile (e.g., a thinner wall) relative to that of the compression sleeve 20 resulting in a lower yield strength of the compression fitting 18. In another example, the compression fitting 18 can have slots or other features formed therein (e.g., in the protrusion 38) that facilitate radial deformation of the protrusion 38 upon the compression sleeve 20 being fit over the compression fitting 18, thus resulting in a lower yield strength of the compression fitting 18. In still other examples, the lower yield strength of the compression fitting 18 can be achieved through a difference of materials of which the compression fitting 18 and the compression sleeve 20 are made. In one example, the compression fitting 18 can be comprised or made of a material having a lower yield strength relative to a yield strength of a material of the compressive sleeve 20. For example, the compression fitting 18 can comprise or be made of annealed copper which is relatively soft and has a low electrical resistance. In other examples, the compression fitting 18 can comprise tin, lead, brass, bronze, silver, gold, or aluminum and others as will be recognized by those skilled in the art. The compression sleeve 20 can comprise or be made of a material having a comparatively higher yield strength material, such as stainless steel, bronze, aluminum and others as will be recognized by those skilled in the art.

The compression fitting 18 can comprise an internal thread arrangement or in other words, internal threads 32 operable to electrically couple to (i.e., thread onto or otherwise mate to) the external threads 22 of the threaded electrical post 12. As such, the internal threads 32 are complementary to the threads of the electrical post 12. The compression fitting 18 can also comprise a base 30 having a base surface configured to electrically couple to the electrical lug 14. The compression sleeve 20 can be sized to at least partially fit over and cover the compression fitting 18, and can be configured to compress the compression fitting 18 in a radial direction (i.e., squeeze the compression fitting 18) when the compression sleeve 20 is fitted at least partially over the compression fitting 18 and advanced axially towards the base 30 of the compression fitting 18. In one example, the compression sleeve 20 can comprise a series of threads that facilitate the threaded connection or coupling to the threaded electrical post 12. Since the compression fitting 18 is comprised of a material having a lower yield strength than that of the compression sleeve 20, the radial compression of the compression sleeve 20 causes the compression fitting 18 to deform, forcing the internal threads 32 of the compression sleeve 20 into an interference fit with the external threads 22 of the threaded electrical post 12. In other words, the radial compression of the compression sleeve 20 causes the compression fitting 18 to conform, at least in part, to the threaded electrical post 12, thus increasing the surface to surface contact between the mating threads at the thread interface over the surface to surface contact prior to the compression fitting 18 being compressed, and creating an interference fit between the mating threads. This interference fit operates to provide a more robust electrical connection in that the electrical connection between the threaded electrical post 12 and the electrical lug 14 is less prone to loosening over time (as compared to the electrical connection in prior electrical connection assemblies), which can occur as a result of thermal expansion and contraction as the electrical connection heats and cools from ambient conditions and current passing through the electrical connection. Indeed, when in use and subject to several cycles of thermal expansion and contraction, the electrical connection assembly 10 disclosed herein is able to maintain a tight electrical connection between the threaded electrical post 12 and the electrical lug 14, and thus preserve the integrity of the electrical connection between these components, which maintains resistivity levels at those initially designed and desired, due to the deformation of the compression fitting 18 and its conformance to the threaded electrical post 12 to create an interference fit, wherein the surface to surface contact between the compression fitting 18 and the threaded electrical post 12 is increased, and wherein gaps between the threaded electrical post 12 and the electrical nut assembly 16 are significantly decreased. In some examples, the internal threads 32 of the compression fitting 18 can have a groove 34 cut at the root of the internal threads 32 to limit damage to the internal threads 32 when the compression fitting 18 is deformed and compressed to the threaded electrical post 12. Indeed, the deeply cut threads 32 of the compression fitting 18 can provide In addition, the compression fitting 18 can comprise a generally longitudinal slot 36 to facilitate the radial inward deformation of the compression fitting 18 (i.e., facilitating a decrease in the diameter of the compression fitting 18 upon being compressed). The generally longitudinal slot 36 can be cut completely through the compression fitting 18, or in some examples, the generally longitudinal slot 36 may extend substantially through the compression fitting 18 leaving a small amount of material to support the compression fitting 18.

Figure 8:
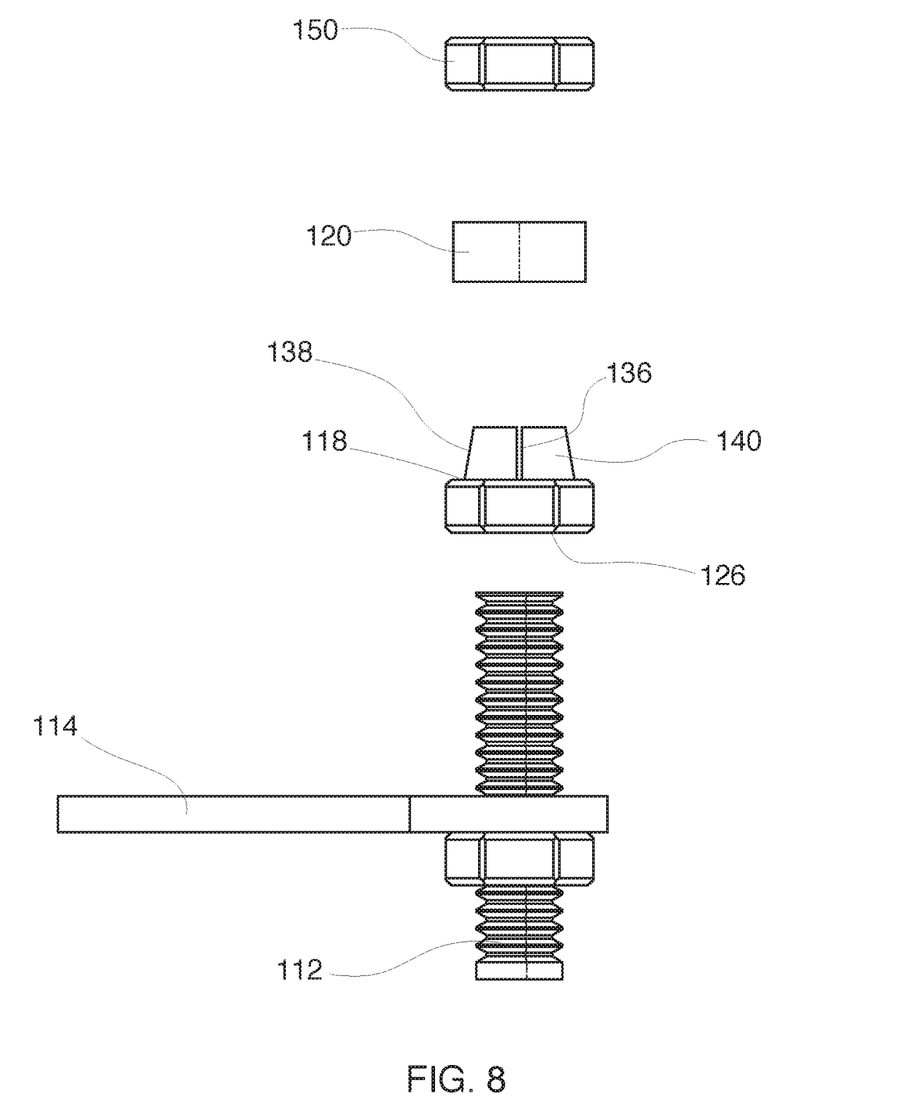
FIG. 8 illustrates an exploded front view of the electrical connection assembly of FIG. 6.
Figure 9:
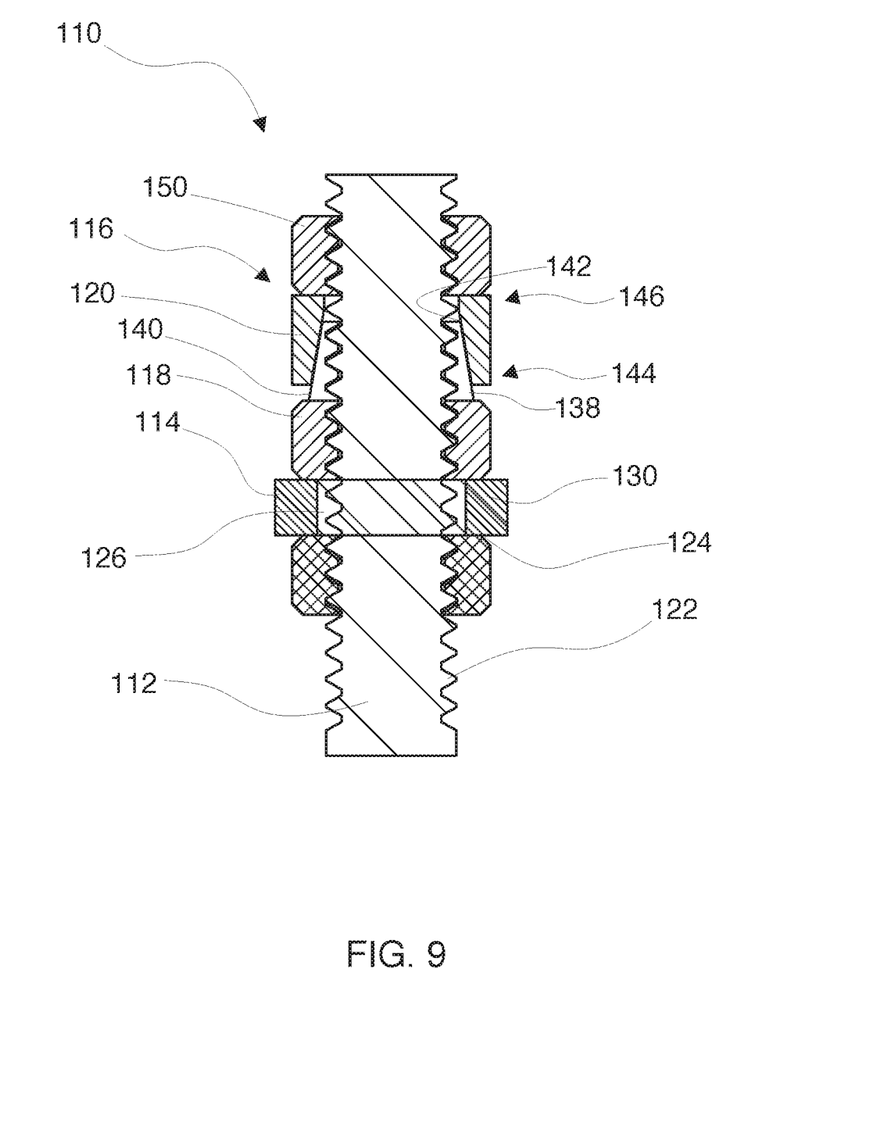
FIG. 9 illustrates a cross-section of the electrical connection assembly of FIG. 6 taken about line B-B of FIG. 7.

The compression fitting 18 can comprise a protrusion 38 having an outer surface 40. In one example, the protrusion 38 can comprise a uniform cross-section along all or a part of its length or along a central axis (the cross-section being taken laterally through the protrusion 38 at various locations along the central axis) (see FIG. 3). In this example, the recess of the compression sleeve 20 can also comprise a uniform cross-section (a non-tapered configuration), The diameter of the recess of the compression sleeve 20 can be slightly larger than the diameter of the protrusion 38, such that the compression sleeve 20 and the protrusion 38 are joined via an interference fit with the compression sleeve 20 compressing the protrusion 38. In another example, the protrusion 38 can be tapered (e.g., the protrusion 38 can be a tapered protrusion). In one aspect, the tapered protrusion 38 can have an increasing cross-section as measured from a distal end, such that the tapered protrusion 38 has a smaller cross-section away from, or distal to, the base 30, with the cross-section increasing towards the base 30. This is shown by the dotted lines in FIG. 3. This tapering concept is also illustrated with the electrical connection assembly 110 discussed below (see FIG. 8). In another example, the protrusion 38 can be partially tapered, such as at the distal end (much like a chamfered end), wherein, in this case, the remaining portion of the protrusion 38 has a cylindrical shape as the outer surface 40 approaches the base 30 (see FIG. 3). In still other examples, the protrusion 38 can be tapered to some degree and the recess of the compression sleeve 20 can be non-tapered or have a uniform cross-section.

Figure 1:
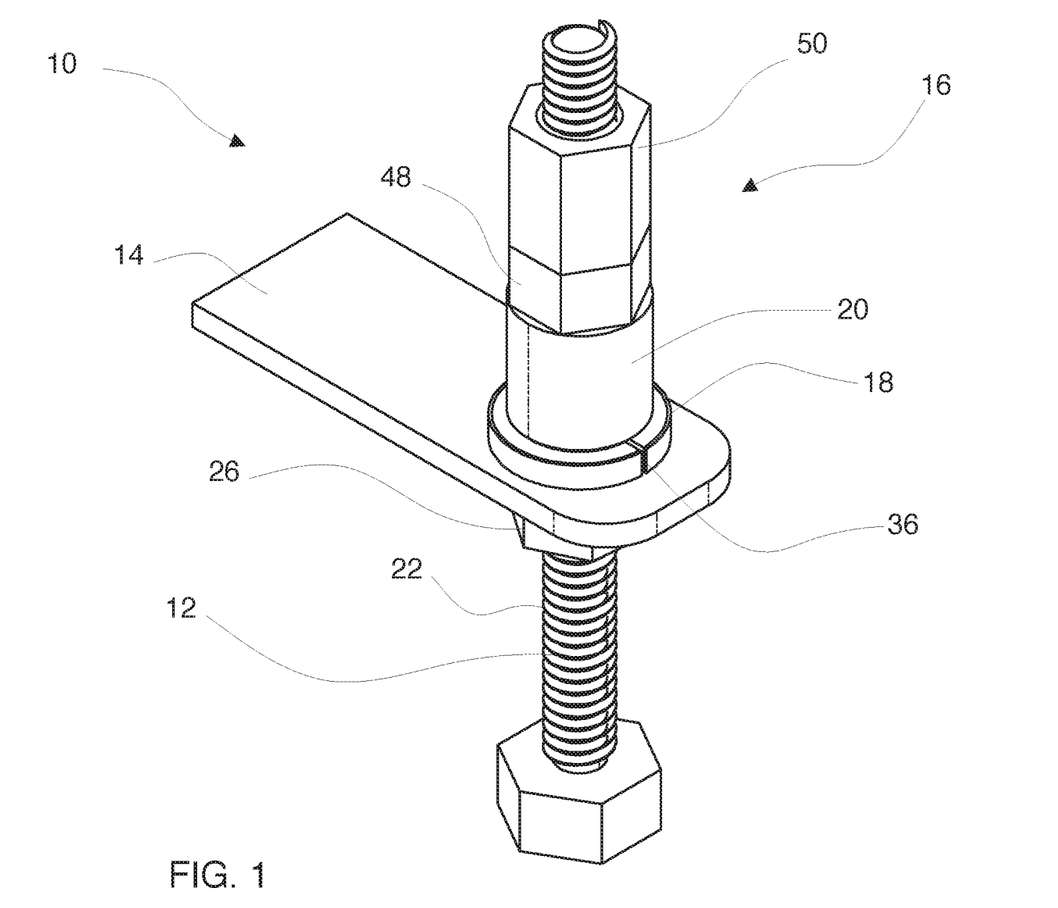
FIG. 1 illustrates an isometric view of an electrical connection assembly in accordance with an example of the present disclosure.
Figure 2:
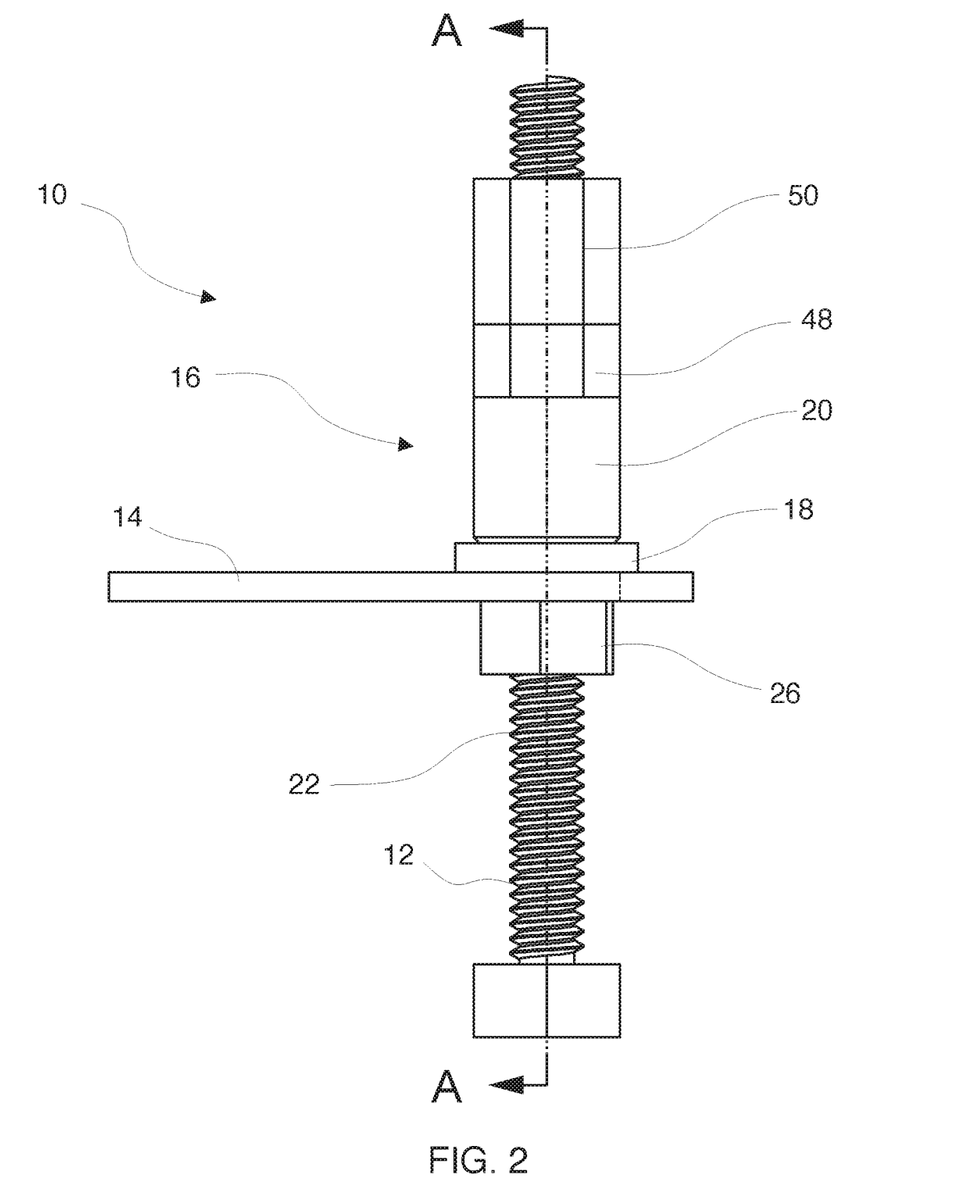
FIG. 2 illustrates a front view of the electrical connection assembly of FIG. 1.
Figure 3:
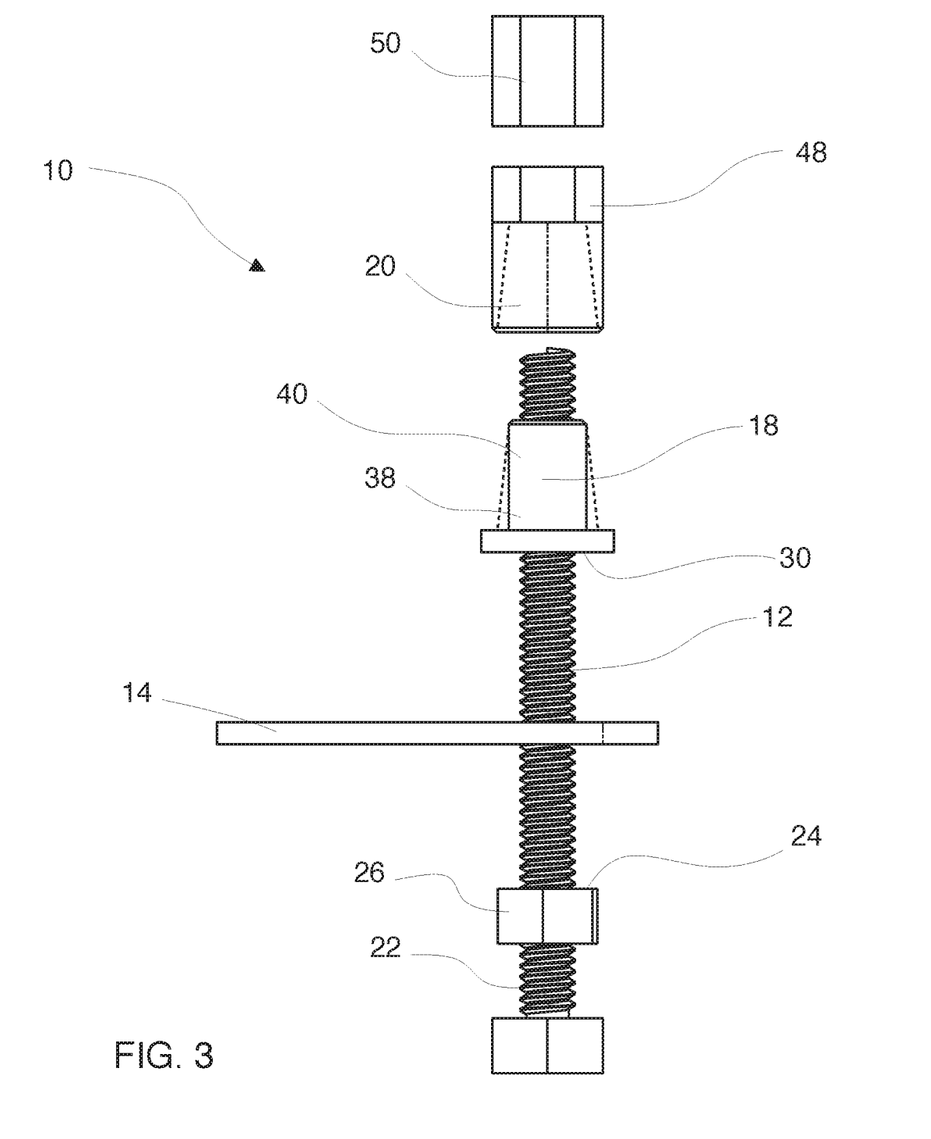
FIG. 3 illustrates an exploded front view of the electrical connection assembly of FIG. 1.
Figures 4, 5:
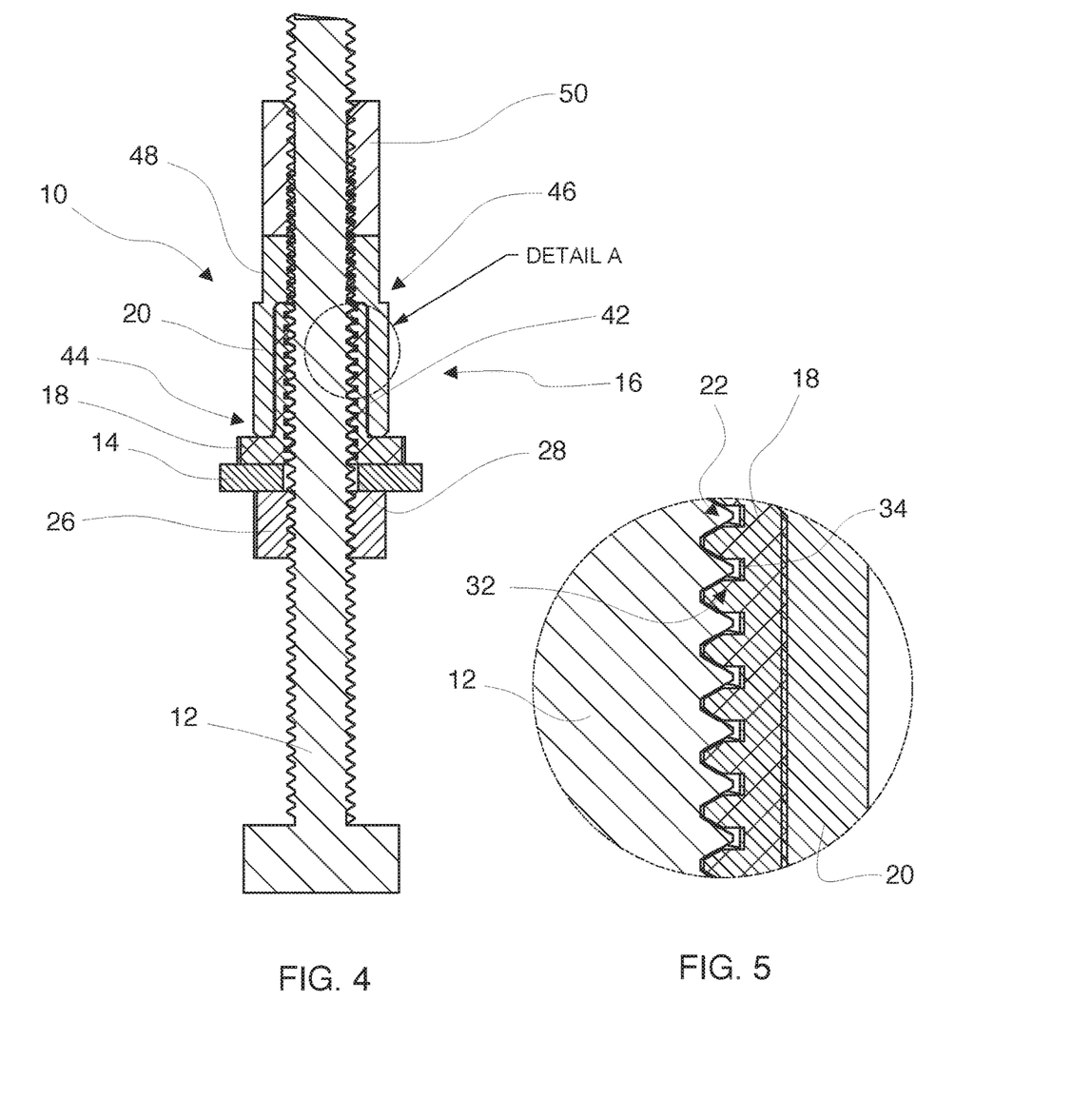
FIG. 4 illustrates a cross section of the electrical connection assembly of FIG. 1 taken about line A-A of FIG. 2.
FIG. 5 illustrates a detailed cross-section view of the electrical connection assembly of FIG. 1 as outlined by detail -A- of FIG. 4.
Figure 6:
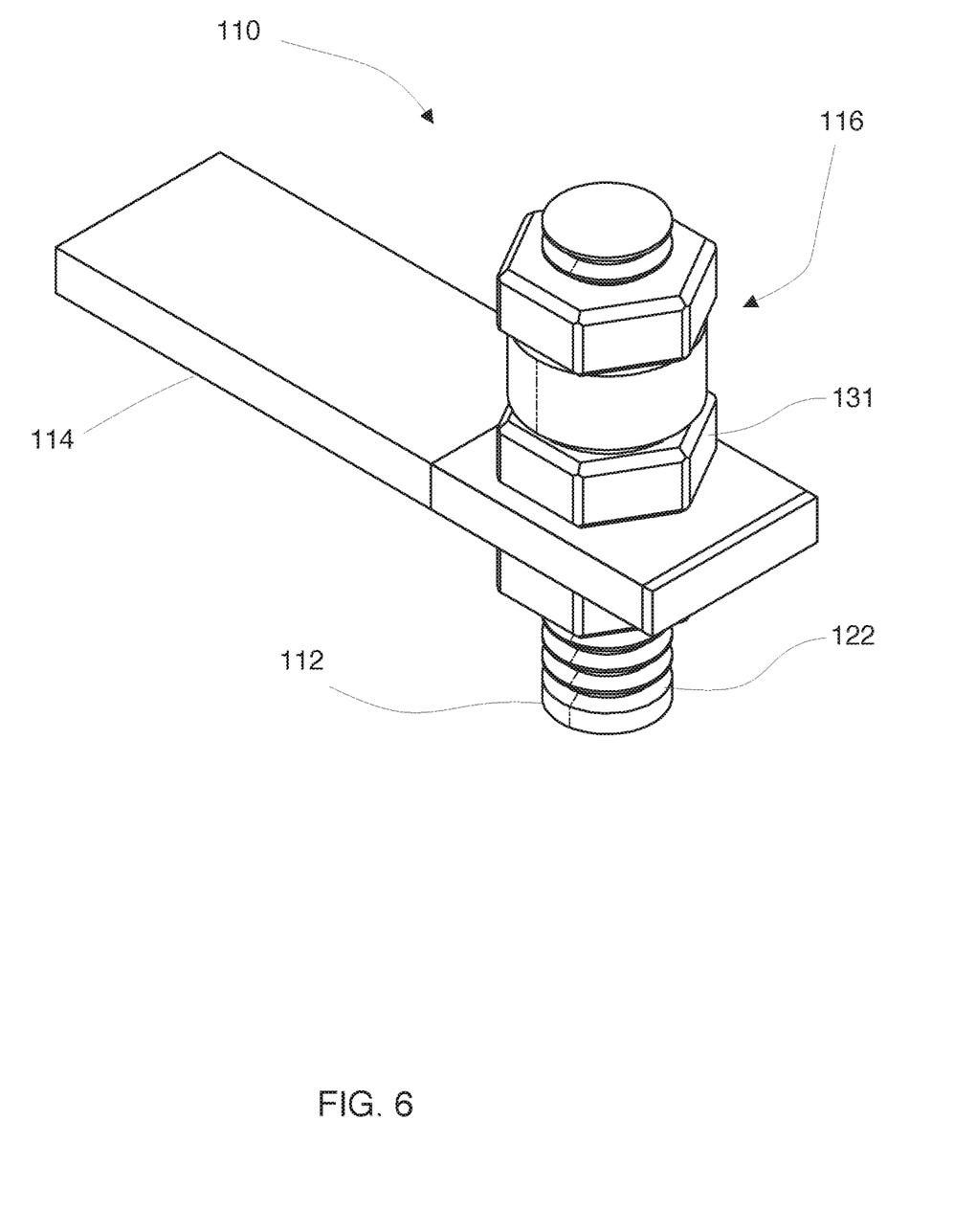
FIG. 6 illustrates an isometric view of an electrical connection assembly in accordance with an example of the present disclosure.
Figure 7:
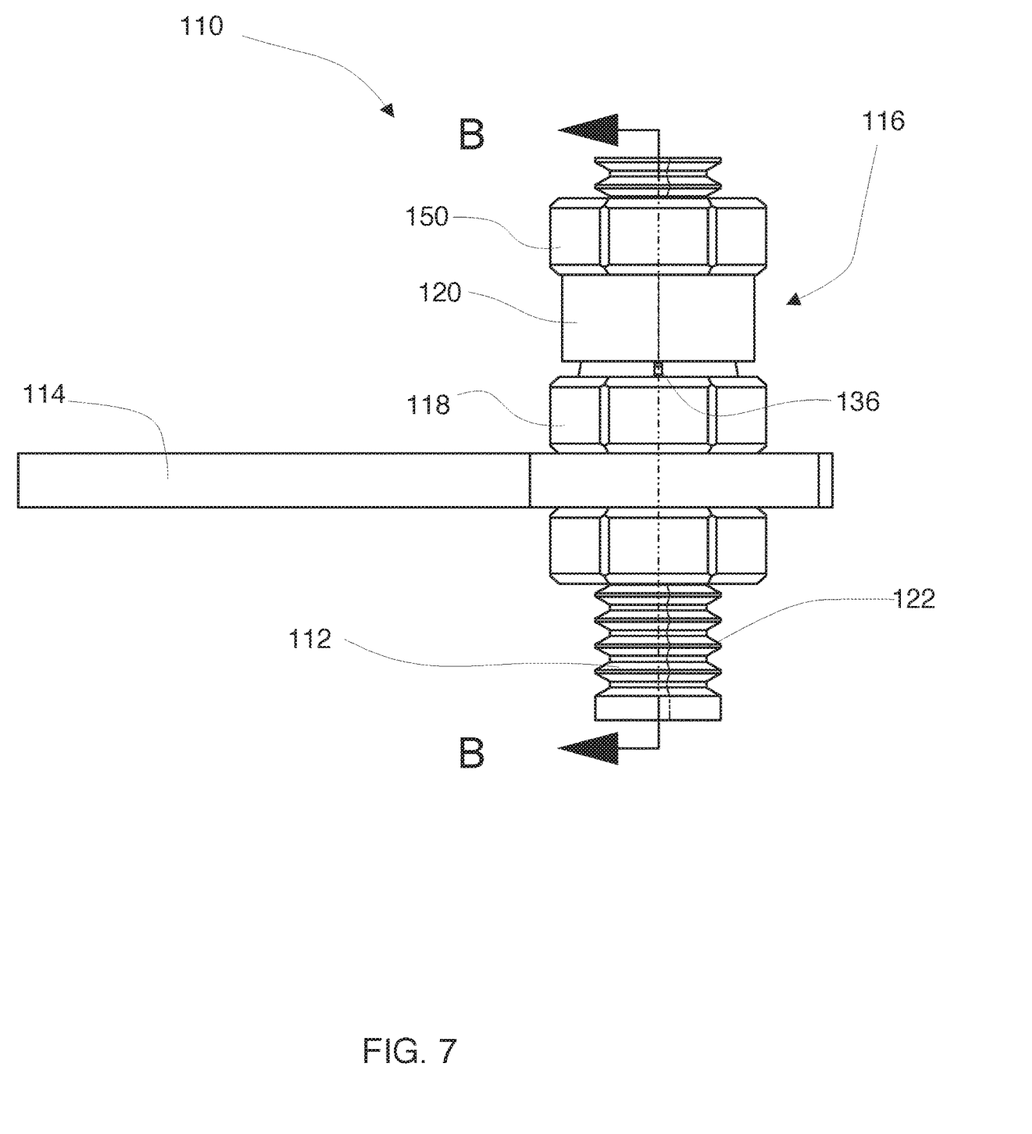
FIG. 7 illustrates a front view of the electrical connection assembly of FIG. 6.

In some examples, the outer surface 40 can be substantially smooth. Thus, the compression sleeve 20 can fit over the compression fitting 18 initially without deforming the compression fitting 18. As the compression sleeve 20 is advanced towards the base 30, the compression sleeve 20 compresses the compression fitting 18 (e.g., through an interference fit with a non-tapering configuration), or as the cross-section (i.e., diameter) of the compression fitting 18 increases with a tapering configuration). In some examples, one or both of the compression fitting 18 and the compression sleeve 20 can be tapered. For example, the compression sleeve 20 can comprise a tapered recess 42 having an internal cross-section that decreases from a first end 44 to a second end 46. Thus, in additional to the cross-section of the compression fitting 18 increasing as the compression sleeve 20 passes over the compression fitting 18, the internal diameter of the tapered recess 42 fitted over the distal portion of the compression fitting 18 can decrease as the compression sleeve 20 is slid over the compression fitting 18.

The compression sleeve 20 can comprise internal threads matched, or complementary, to the external threads 22 of the threaded electrical post 12. Thus, the compression sleeve 20 can be tightened and advanced by turning the compression sleeve 20 about the threaded electrical post 12. At least one pair of parallel flats 58 can be formed on the compression sleeve 20 to facilitate tightening or advancing the compression sleeve 20 on the threaded electrical post 12 and onto the compression fitting 18 to compress the compression fitting 18. For instance, pairs of flats 48 can be cut onto opposing sides of the compression sleeve 20 to receive a wrench. Or, a hexagonal bolt head may be formed in the compression sleeve 20.

A lock nut 50 can be used to lock the compression sleeve 20 over the compression fitting 18. For example, once the compression sleeve 20 has been installed and the compression fitting 18 is compressed against the threaded electrical post 12 and the electrical lug 14, a lock nut 50 can be threaded over the threaded electrical post 12 and tightened against the compression sleeve 20.

FIGS. 6-9 illustrate another example of an electrical connection assembly 110 in accordance with an example of the present disclosure. Except where indicated, the electrical connection assembly 110 is similar in many respects to the electrical connection assembly 10 discussed above and shown in FIGS. 1-5. As such, the above discussion is incorporated here, and can be referenced, at least in part, to provide an understanding of the electrical connection assembly 110 discussed below, where applicable, and as will be recognized by those skilled in the art.

The electrical connection assembly 110 comprises a threaded electrical post 112, an electrical lug 114, and an electrical nut assembly 116 for coupling the electrical lug 114 to the threaded electrical post 112. The electrical nut assembly 116 can comprise a compression fitting 118 and a compression sleeve 120. In use, and as configured to do so, the compression sleeve 120 compresses the compression fitting 118 around the threads of the threaded electrical post 112 to eliminate at least some air gaps between internal threads of the compression fitting 118 and external threads 122 of the threaded electrical post 112 to reduce electrical resistance and ensure a robust electrical connection.

The threaded electrical post 112 can be a conventional threaded electrical post like the threaded electrical post 112 of FIGS. 1-5 and can comprise external threads 122 and a planar support surface 124. The electrical lug 114 can be a conventional electrical lug like the electrical lug of FIGS. 1-5 and can comprise an aperture 126 sized and shaped to receive the threaded electrical post 112, or in other words, to facilitate fitting of the electrical lug 114 over the threaded electrical post 112.

When assembled, the electrical lug 114 is place over the threaded electrical post 112 with the threaded electrical post 112 received in the aperture 126 of the electrical lug 114. The electrical lug 114 can then be slid along the threaded electrical post 112 until the electrical lug 114 contacts the planar support surface 124. As will be described in relation to the electrical nut assembly 116, the electrical nut assembly 116 can then be tightened on the threaded electrical post 112 until the electrical nut assembly 116 contacts the electrical lug 114 compressing the electrical lug 114 between the planar support surface 124 and the electrical nut assembly 116, thereby securing the electrical lug 114 to the threaded electrical post 112.

Like the example of FIGS. 1-5, the compression fitting 118 of the electrical nut assembly 116 can have a lower yield strength relative to a yield strength of the compression sleeve 120, such that the compression sleeve 120 is able to impart a radial compression force to the compression fitting 118 to deform the compression fitting 118. In some examples, the lower yield strength of the compression fitting 118 can be achieved as a result of the structural configuration of the compression fitting 118, even when the compression fitting 18 and the compression sleeve 120 are made of the same material. In one aspect, the compression fitting 118 can have a thinner profile (e.g., a thinner wall) relative to that of the compression sleeve 120 resulting in a lower yield strength of the compression fitting 118. In another example, the compression fitting 118 can have slots or other features formed therein (e.g., in the protrusion 138) that facilitate radial deformation of the protrusion 138 upon the compression sleeve 120 being fit over the compression fitting 118, thus resulting in a lower yield strength of the compression fitting 118. In still other examples, the lower yield strength of the compression fitting 118 can be achieved through a difference of materials of which the compression fitting 118 and the compression sleeve 120 are made. In one example, the compression fitting 118 can be comprised or made of a material having a lower yield strength relative to a yield strength of a material of the compressive sleeve 120. Additionally, the compression fitting 118 can further comprise at least one pair of parallel flats 131 to facilitate tightening the compression fitting 118 on the threaded electrical post 112.

The compression fitting 118 can comprise an internal thread arrangement, or in other words, internal threads 132, operable to electrically couple to the external threads 122 of the threaded electrical post 112 and a base 130 having a base surface configured to electrically couple to the electrical lug 114. The compression sleeve 120 can be sized to at least partially cover the compression fitting 118, and can be configured to compress the compression fitting 118 in a radial direction when the compression sleeve 120 is fitted at least partially over the compression fitting 118 and pressed axially towards the base surface 130 of the compression fitting 118. Since the compression fitting 118 is comprised of a material having a lower yield strength than that of the compression sleeve 120, the radial compression of the compression sleeve 120 causes the compression fitting 118 to deform, forcing the internal threads 132 of the compression sleeve 120 into an interference fit with the external threads 122 of the threaded electrical post 112. In addition, the compression fitting 118 can comprise a plurality of generally longitudinal slots 136 to facilitate the deformation of the compression fitting 118. The generally longitudinal slots 136 can be cut completely through the compression fitting 18, or in some examples, the generally longitudinal slots 136 may extend substantially through the compression fitting 118 leaving a small amount of material to support the compression fitting 118.

The compression fitting 118 can comprise a tapered protrusion 138 with a smooth outer surface 140 that is tapered to have a smaller cross-section away from, or distal to, the base 130 and a larger cross-section proximal to the base 130. The compression sleeve 120 can comprise a tapered recess 142 having an internal cross-section that decreases from a first end 144 to a second end 146. The tapered recess 142 can comprise a smooth tapered inner surface to facilitate sliding over the tapered protrusion 138 of the compression fitting 118. Thus, the compression sleeve 120 can fit over the compression fitting 118 initially without deforming the compression fitting 118. Additionally, the compression sleeve 120 can have a smooth cylindrical bore to facilitate sliding the compression sleeve 120 over the threaded electrical post 112. As the compression sleeve 120 is advanced towards the base 130, the compression sleeve 120 compresses the compression fitting 118 as the cross-section of the compression fitting 18 increases and the cross-section of the tapered recess 142 decreases.

The compression sleeve 120 can have a smooth cylindrical outer surface and can be tightened by turning a lock nut 150 about the threaded electrical post 112. For example, once the compression fitting 118 has been installed by threading the compression fitting 118 over the threaded electrical post 112 until the compression fitting 118 contacts the electrical lug 114, the compression sleeve 120 can be slid over the compression fitting 118. The lock nut 150 can then be advanced until the lock nut 150 contacts the compression sleeve 120 and forces the compression sleeve 120 further over the compression fitting 118 deforming the compression fitting 118.

The described examples of a wire connection assembly can be used to secure a wire lug to a wire post for the purpose of obtaining or achieving a more robust electrical connection between them. To secure the wire lug to the wire post, the wire lug is slid over the wire post, via an aperture in the wire lug, until it contacts a support surface. A compression fitting is then threaded over the threaded wire post until the compression fitting contacts (i.e., seats against) the wire lug. A compression sleeve is then advanced over the compression fitting and the assembly tightened to compress the compression fitting axially against the wire lug and radially against the electrical post, thereby deforming the compression fitting and establishing a robust electrical connection.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described, One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. An electrical nut assembly for coupling an electrical lug to an electrical post, the electrical nut assembly comprising:
   a compression fitting having a first yield strength, the compression fitting comprising an internal thread operable to electrically couple to the electrical post, and a base having a base surface configured to electrically couple to the electrical lug; and
   a compression sleeve having a second yield strength greater than the first yield strength, the compression sleeve sized to at least partially fit over the compression fitting, and configured to compress the compression fitting in a radial direction when fitted at least partially over the compression fitting and advanced axially towards the base surface.

2. The electrical nut assembly of claim 1, wherein the compression fitting comprises a first material and the compression sleeve comprises a second material, wherein the second material has a yield strength greater than a yield strength of the first material.

3. The electrical nut assembly of claim 1, wherein the compression fitting comprises one or more slots formed therein that facilitate radial deformation of the compression fitting.

4. The electrical nut assembly of claim 1, wherein the compression fitting comprises a wall thickness thinner than a wall thickness of the compression sleeve.

5. The electrical nut assembly of claim 1, wherein the internal thread comprises a plurality of internal threads.

6. The electrical nut assembly of claim 1, wherein the compression sleeve comprises an internal thread configured to be threaded over the electrical post.

7. The electrical nut assembly of claim 1, wherein the compression fitting comprises at least one longitudinal slot.

8. The electrical nut assembly of claim 1, further comprising a lock nut comprising an internal thread, the lock nut configured to lock the compression sleeve in place against the compression fitting.

9. The electrical nut assembly of claim 1, wherein the compression sleeve has a smooth tapered inner surface configured to interface with an outer surface of the compression fitting.

10. The electrical nut assembly of claim 1, wherein the compression fitting has at least one set of parallel flat surfaces on an external surface of the compression fitting that facilitate advancing the compression sleeve along the electrical post and onto the compression fitting to compress the compression fitting.

11. The electrical nut assembly of claim 1, wherein the compression sleeve has a smooth cylindrical outer surface.

12. The electrical nut assembly of claim 1, wherein the compression fitting comprises a protrusion, and wherein the compression sleeve comprises a recess configured to receive the protrusion.

13. The electrical nut assembly of claim 12, wherein at least one of the protrusion and the recess of the compression sleeve are each at least partially tapered.

14. An electrical connection assembly comprising:
a threaded electrical post electrically coupled to an electrical component, the threaded electrical post comprising an external thread and a planar support surface;
an electrical lug comprising an aperture, the electrical lug being supported by the planar support surface with the threaded electrical post extending through the aperture;
a compression fitting having a first yield strength, the compression fitting comprising an internal thread sized and configured to complement the external thread of the threaded electrical post; and
a compression sleeve having a second yield strength greater than the first yield strength, the compression sleeve being at least partially fit over the compression fitting and compressing the compression fitting in a radial direction and an axial direction against the planar support surface.

15. The electrical connection assembly of claim 14, wherein compression of the compression fitting by the compression sleeve deforms the internal thread of the compression fitting and conforms the internal thread of the compression fitting to the external thread of the threaded electrical post, thereby reducing gaps between the internal thread and the external thread.

16. The electrical connection assembly of claim 14, wherein compression of the compression fitting by the compression sleeve deforms the internal thread of the compression fitting and creates an interference fit of the internal threads of the compression sleeve with the external threads of the threaded electrical post.

17. The electrical connection assembly of claim 14, wherein the compression sleeve comprises an internal thread threaded on the external thread of the threaded electrical post.

18. The electrical connection assembly of claim 14, wherein the compression fitting comprises a tapered protrusion and the compression sleeve comprises a tapered recess, wherein the tapered recess is fitted over the tapered protrusion.

19. The electrical connection assembly of claim 14, wherein the compression fitting comprises at least one longitudinal slot to facilitate deformation of the compression fitting.

20. The electrical connection assembly of claim 14, further comprising a locknut comprising an internal thread and threaded over the threaded electrical post, the locknut locking the compression sleeve in place against the compression fitting.

21. A method of securing an electrical lug to an electrical post, the method comprising:
fitting an electrical lug onto an electrical post having an external thread;
fitting a compression fitting having a first yield strength onto the electrical post and advancing the compression fitting against the electrical lug;
fitting a compression sleeve, having a second yield strength greater than the first yield strength, over the compression fitting and advancing the compression sleeve axially to axially compress the compression fitting against the electrical lug and radially compress the compression fitting against the electrical post; and
compressing the compression fitting sufficiently to deform the compression fitting, and to conform the compression fitting, at least in part, to the electrical post.

22. The method of claim 21, further comprising threading a lock nut over the electrical post to secure the compression sleeve, compression fitting and the electrical lug.

23. The method of claim 21, wherein the compression sleeve is pressed axially by way of a nut threaded over the electrical post.

* * * * *